United States Patent
Hertzberg et al.

(10) Patent No.: US 6,843,052 B2
(45) Date of Patent: Jan. 18, 2005

(54) EXHAUST EMISSION CONTROL SYSTEM HAVING A NITROGEN OXIDE ADSORBER AND METHOD FOR DESULFATING THE NITROGEN OXIDE ADSORBER

(75) Inventors: Andreas Hertzberg, Stuttgart (DE); Dirk Voigtländer, Korntal-Münchingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/565,898

(22) Filed: May 5, 2000

(65) Prior Publication Data

US 2002/0148218 A1 Oct. 17, 2002

(30) Foreign Application Priority Data

May 5, 1999 (DE) .......................................... 199 20 515

(51) Int. Cl.[7] ................................................. F01N 3/00
(52) U.S. Cl. ........................... 60/274; 60/276; 60/285; 60/301
(58) Field of Search ........................ 60/274, 277, 285, 60/286, 295, 301

(56) References Cited

U.S. PATENT DOCUMENTS

| 5,402,641 | A | * | 4/1995 | Katoh et al. .................. 60/285 |
| 5,433,074 | A | * | 7/1995 | Seto et al. ..................... 60/285 |
| 5,437,153 | A | * | 8/1995 | Takeshima et al. ........... 60/285 |
| 5,655,363 | A | * | 8/1997 | Ito et al. ....................... 60/277 |
| 5,657,625 | A | * | 8/1997 | Koga et al. ................... 60/274 |
| 5,724,808 | A | * | 3/1998 | Ito et al. ....................... 60/277 |
| 5,727,385 | A | * | 3/1998 | Hepburn ....................... 60/274 |
| 5,758,493 | A |   | 6/1998 | Asik et al. |
| 5,916,129 | A | * | 6/1999 | Modica et al. ................ 60/274 |
| 5,974,788 | A | * | 11/1999 | Hepburn et al. .............. 60/285 |
| 5,974,790 | A | * | 11/1999 | Adamczyk et al. ........... 60/285 |
| 5,983,627 | A | * | 11/1999 | Asik ............................. 60/285 |
| 5,992,142 | A | * | 11/1999 | Pott .............................. 60/285 |
| 6,119,450 | A | * | 9/2000 | Boegner et al. .............. 60/274 |
| 6,145,303 | A | * | 11/2000 | Strehlau et al. .............. 60/274 |
| 6,161,377 | A | * | 12/2000 | Boegner et al. .............. 60/274 |
| 6,161,378 | A | * | 12/2000 | Hanaoka et al. ............. 60/286 |
| 6,173,571 | B1 | * | 1/2001 | Kaneko et al. ............... 60/286 |
| 6,199,373 | B1 | * | 3/2001 | Hepburn et al. ............. 60/274 |
| 6,250,074 | B1 | * | 6/2001 | Suzuki et al. ................ 60/285 |
| 2002/0033017 | A1 | * | 3/2002 | Bruggemann et al. ....... 60/295 |
| 2003/0213232 | A1 | * | 11/2003 | Brisley et al. ................ 60/285 |

FOREIGN PATENT DOCUMENTS

| DE | 195 22 165 | 12/1995 |
| DE | 197 31 623 | 1/1999 |
| DE | 197 31 624 | 1/1999 |
| DE | 197 47 222 | 3/1999 |
| DE | 198 37 074 | 3/1999 |
| DE | 198 01 815 | 7/1999 |
| DE | 198 02 631 | 7/1999 |
| EP | 0 636 770 | 2/1995 |
| EP | 0 581 279 | 10/1997 |
| EP | 0 893 154 | 1/1999 |

* cited by examiner

Primary Examiner—Tu M. Nguyen
(74) Attorney, Agent, or Firm—Kenyon & Kenyon

(57) ABSTRACT

An exhaust emission control system having a nitrogen oxide adsorber and a desulfating device, and a method for desulfating a nitrogen oxide absorber are disclosed. The desulfating device is managed so as to establish an oscillatingly rich and lean exhaust gas composition during a respective desulfating operation, and contains an oxygen accumulator downstream from the nitrogen oxide adsorber. The nitrogen oxide adsorber is effectively desulfated by way of a corresponding desulfating method, and released sulfur compounds are thereby simultaneously oxidized. The exhaust emission control systems can be utilized, for example, with a motor vehicle internal combustion engine.

6 Claims, 1 Drawing Sheet

EXHAUST EMISSION CONTROL SYSTEM HAVING A NITROGEN OXIDE ADSORBER AND METHOD FOR DESULFATING THE NITROGEN OXIDE ADSORBER

FIELD OF THE INVENTION

The present invention relates to an exhaust emission control system having a nitrogen oxide adsorber and a method for desulfating the nitrogen oxide adsorber.

RELATED TECHNOLOGY

Exhaust emission control systems having a nitrogen oxide adsorber are used, for example, in motor vehicles with internal combustion engines in order to purify the exhaust gases emitted therefrom, but are also usable for purification of the exhaust gases of other types of combustion sources. The purpose of the nitrogen oxide adsorber is to minimize nitrogen oxide emissions. For that purpose, in operating phases with an increased nitrogen oxide load in the exhaust gas—as is the case when an internal combustion engine is operating in lean mode, principally because of insufficient conversion in a three-way catalytic converter—nitrogen oxide is accumulated in the nitrogen oxide adsorber and can then, in a later operating phase established in suitable fashion for the purpose (for example when an internal combustion engine is operating in rich mode), be released again by way of a desorption operation and then converted to nitrogen, for example in a reduction reaction. "Lean" and "rich" mode are to be understood here to mean, as usual, operation of the combustion source with a lean or rich engine air ratio, i.e. with an air-fuel ratio for the air-fuel mixture burned in the combustion source that is respectively above or below the stoichiometric value.

One known difficulty with such systems is the fact that because of the sulfur that is contained in ordinary fuels and motor oils, sulfur dioxide is present in the exhaust gas and can result, due to sulfate formation, in sulfur poisoning of the nitrogen oxide adsorber, thus reducing over time its storage capacity for nitrogen oxide. It is therefore known to subject the nitrogen oxide adsorber, whenever its nitrogen oxide storage capacity perceptibly declines, to a desulfating operation in order to remove the deposited sulfate from it. The term "nitrogen oxide adsorber" is intended in this instance to encompass both the case in which the latter includes a single adsorber element, and the equally known case in which the nitrogen oxide adsorber element is preceded by a so-called "$SO_x$ trap" which temporarily stores the sulfur oxides and thus keeps them away from the nitrogen oxide adsorber element, and analogously is subjected occasionally to a desulfating process.

In order to desulfate the nitrogen oxide adsorber, it is known to switch the exhaust gas composition over from lean to rich, for example by appropriate operational adjustment of the combustion source, and to raise the temperature in the exhaust system, for example by operating the combustion source so as to result in higher exhaust temperatures and/or by way of an electrical heating device. A desulfating method of this kind is described in European Patent Document No. 0 636 770 A1. Other similar desulfating methods, which additionally implement secondary air injection or split operation of a multi-cylinder internal combustion engine representing the combustion source, with one portion of the cylinders operated rich and the remaining portion operated lean, are described in German Patent Document No. 195 22 165 A1 and in German Patent Application Nos. 197 47 222.2 and 198 02 631.5.

During desulfating of the nitrogen oxide adsorber, sulfur compounds thus pass into the exhaust gas that is leaving the nitrogen oxide adsorber; sulfur dioxide and hydrogen sulfide, in particular, occur. The latter, as is known, has a foul smell and creates an odor nuisance even at low concentrations.

An exhaust emission control system disclosed in European Patent Document No. 0 581 279 B1 contains, downstream from a nitrogen oxide adsorber, a further catalytic element having an oxygen-accumulating and oxidizing function. The purpose of this catalytic element is to oxidize, during the nitrogen oxide desorption phase of the nitrogen oxide adsorber, the hydrocarbons and carbon monoxide that may still be present in the exhaust gas emerging from the nitrogen oxide adsorber. In operating phases with a lean exhaust gas composition, i.e. generally during the nitrogen oxide adsorption phases of the nitrogen oxide adsorber, this oxidizing catalytic converter can accumulate oxygen from the exhaust gas which is then available for later oxidation of hydrocarbons or carbon monoxide.

SUMMARY OF THE INVENTION

An object of the present invention is to make available an exhaust emission control system having a nitrogen oxide adsorber and a desulfating method suitable for its nitrogen oxide adsorber, in which the nitrogen oxide adsorber can be effectively desulfated and which at the same time ensures that no non-oxidized sulfur compounds remain in undesirable quantities in the exhaust gas discharged to the atmosphere.

The present invention provides an exhaust emission control system for a combustion device, in particular a motor vehicle internal combustion engine, having a nitrogen oxide adsorber (4) and a desulfating device for performing desulfating operations for the nitrogen oxide adsorber. The desulfating device is managed so as to establish an oscillatingly rich and lean exhaust gas composition during a respective desulfating operation. The desulfating device includes an oxygen accumulator (5) downstream from the nitrogen oxide adsorber (4).

The present invention also provides a method for desulfating a nitrogen oxide adsorber (4) of an exhaust emission control system for a combustion device, in particular a motor vehicle internal combustion engine, wherein the exhaust gas composition is made, during the desulfating operation, oscillatingly rich and lean by corresponding operation of the combustion device (1) during the periods with a lean composition oxygen is accumulated in an oxygen accumulator (5) downstream from the nitrogen oxide adsorber (4), and during the periods with a rich composition it is released from the oxygen accumulator to oxidize sulfur compounds.

In one embodiment of the exhaust emission control system according to the present invention, the desulfating device is managed so as to establish an oscillatingly rich and lean exhaust gas composition during a respective desulfating operation, and contain an oxygen accumulator downstream from the nitrogen oxide adsorber. With these features, the desulfating device is capable of effectively desulfating the nitrogen oxide adsorber as soon as is necessary in each case in order to maintain its nitrogen oxide storage capability, without thereby causing appreciable quantities of hydrogen sulfide or other unoxidized sulfur compounds to remain in the exhaust gas discharged to the atmosphere. During the lean operating phases of the desulfating operation, the oxygen accumulator can receive and accumulate oxygen contained in the exhaust gas. During the rich operating phases of the respective desulfating operation, the sulfur deposited in the nitrogen oxide adsorber, primarily in sulfate form, can be released again. Hydrogen sulfide and/or other unoxidized sulfur compounds produced as a result can then be oxidized with the oxygen discharged from the oxygen accumulator, and thus eliminated. Preferably, this sulfur oxidation is assisted by a suitable oxidation catalyst material that can be provided in the oxygen accumulator itself or in a downstream catalytic element.

In an another embodiment of the exhaust emission control system according to the present invention, the oxygen accumulator is constituted by a conventional oxidation catalyst or three-way catalytic converter with oxygen storage capability. This catalyst stores oxygen during the lean operating phases of the desulfating operation, and uses it in the rich operating phases to oxidize the hydrogen sulfide and any other sulfur compounds.

In a third exemplary embodiment of the exhaust emission control system according to the present invention, the desulfating device has a lambda probe downstream from the oxygen accumulator and an oxygen concentration controller for controlling the oxygen concentration in the exhaust gas (also referred to as the exhaust gas air-fuel ratio) as a function of the measurement signal of the lambda probe. As a result, during desulfating a switchover can be made from a rich to a lean exhaust gas composition whenever no further oxygen is present, and from lean to rich exhaust gas composition when the oxygen accumulator is once again charged with oxygen.

BRIEF DESCRIPTION OF THE DRAWINGS

The present invention is described in further detail below with reference to the drawings, in which.

DETAILED DESCRIPTION

Figure 1:
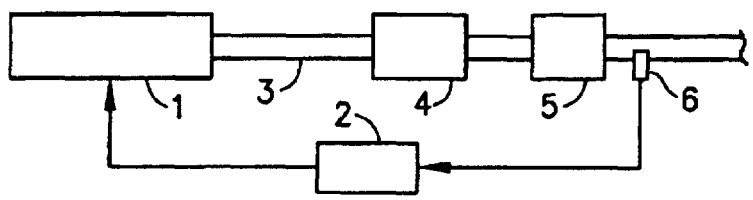
FIG. 1 shows a schematic block diagram of a combustion device having an associated exhaust emission control system with a nitrogen oxide adsorber catalyst and a downstream three-way catalytic converter.

FIG. 1 schematically shows a combustion device in the form of a combustion source 1, associated with which are a combustion control unit 2 and an exhaust emission control system. Combustion source 1 can be, for example, a motor vehicle internal combustion engine, in particular a lean-operating Otto-cycle engine or a diesel engine. In this case, combustion control unit 2 is constituted by a corresponding engine control device.

The exhaust emission control system contains a catalytic nitrogen oxide adsorber, i.e. a nitrogen oxide adsorber catalyst 4, located in exhaust system 3 of combustion source 1, and a three-way catalytic converter 5, capable of storing oxygen, positioned downstream therefrom in exhaust system 3. Located on the outlet side of three-way catalytic converter 5 is a lambda probe 6 whose output signal is conveyed to combustion control unit 2. In addition to these components, further components of combustion source 1 and/or of the exhaust emission control system can be provided in conventional fashion.

In accordance with the general desire for minimal fuel consumption, combustion source 1 is operated as often as possible in lean mode, i.e. with a lean air-fuel mixture, to the extent this is permitted by the operating situation. Lean operation generally results in an elevated nitrogen oxide load in the exhaust gas of combustion source 1, especially because under these conditions, insufficient conversion occurs in a three-way catalytic converter. The purpose of adsorber catalyst 4 is to remove these nitrogen oxides from the exhaust gas flow by adsorption. As soon as its nitrogen oxide adsorption capability is exhausted during this adsorption mode, a switchover is made to desorption mode. In the desorption operating phase, adsorber catalyst 4 is regenerated by the fact that the nitrogen oxides, previously deposited primarily in nitrate or nitrite form, are desorbed and converted. Several conventional procedures may be used for this conversion, such as exhaust gas recirculation or catalytic reduction with the addition of a suitable reducing agent such as unburned fuel or ammonia via combustion source 1 or via an external injector directly into exhaust system 3. Following complete desorption of the nitrogen oxides, operation can then be switched back to adsorption mode. Desorption can be performed relatively quickly by establishing suitable conditions, so that the desorption phases can be kept relatively short as compared to the adsorption phases. In this manner, adsorber catalyst 4 is operated alternatingly in adsorption and desorption modes.

When sulfur-containing fuels—for example ordinary sulfur-containing fuels for motor vehicle internal combustion engines—are used for combustion source 1, not only nitrogen oxides but also sulfur contained in the exhaust gas is deposited in adsorber catalyst 4, principally in sulfate form. The deposited sulfur is fairly resistant in terms of the usual nitrogen oxide desorption conditions, so that the sulfur deposited in adsorption mode is not completely released during nitrogen oxide desorption operation. Since the deposited sulfur blocks the nitrogen oxide adsorption centers of adsorber catalyst 4, sulfur poisoning of the latter occurs over time, causing its nitrogen oxide storage capacity to decline. When the nitrogen oxide storage capacity has thus dropped below a specific value, a desulfating operation is therefore performed, in which adsorber catalyst 4 is subjected to suitable desulfating conditions for a period of time that typically is much longer than that of a respective nitrogen oxide desorption phase.

Characteristically, these desulfating conditions in the present instance involve establishing an exhaust gas composition oscillating between rich and lean, i.e. an exhaust gas air ratio that oscillates between a "rich value" that is less than the stoichiometric value of one and a "lean value" that is greater than the stoichiometric value of one. This can be brought about, for example, by a correspondingly oscillating setting of the air ratio for the air-fuel mixture burned in combustion source 1. Any other conventional technique for establishing an alternatingly "rich" and "lean" exhaust gas air ratio can also be used, for example a "rich mode" of combustion source 1 persisting beyond desulfating combined with occasional secondary air delivery, or an occasional delivery of reducing agent directly into exhaust system 3 to enrich the exhaust gas, etc. In addition to these features, provision is made for maintaining a suitable desulfating temperature of, for example, 600° C. or above. As a result, the sulfates become unstable and can be desorbed, i.e. more sulfur passes into the exhaust gas in the form of various sulfur compounds.

During the phases with a lean exhaust gas composition, the sulfur compounds contained in the exhaust gas can be oxidized by the oxygen also contained in the exhaust gas. In addition, excess oxygen can be introduced into three-way catalytic converter 5, which functions as an oxygen accumulator. In the phases with a rich exhaust gas composition alternating therewith, desorption of the sulfur deposited (principally as sulfate) in adsorber catalyst 4 occurs therein under the desulfating conditions that are established. At the same time, the sulfur compounds contained in the exhaust gas are oxidized in the downstream three-way catalytic converter 5, for which purpose the accumulated oxygen therein is released. It is thereby possible to achieve effective oxidation of troublesome sulfur compounds, in particular conversion of hydrogen sulfide into water and sulfur dioxide, during the entire desulfating operation.

Figure 2:
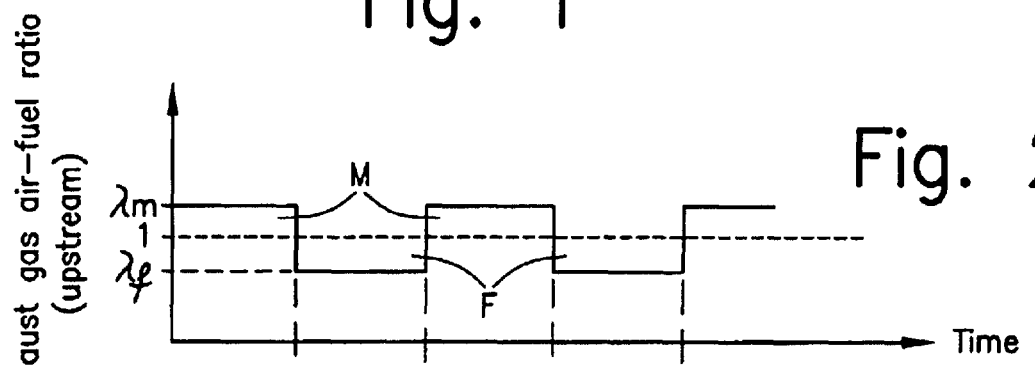
FIGS. 2 through 4 show time-synchronous graphical diagrams of the change over time, during a desulfating operation, in the exhaust gas air ratio upstream from the three-way catalytic converter (FIG. 2), in the quantity of oxygen stored in the three-way catalytic converter (FIG. 3), and in the measurement signal of a lambda probe positioned downstream from the three-way catalytic converter (FIG. 4).
Figure 3:
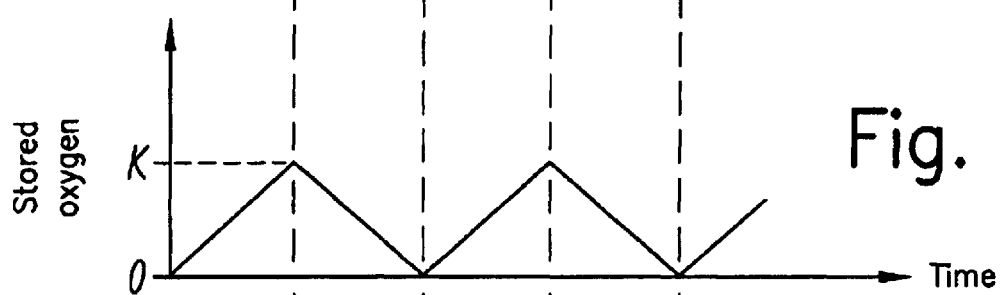
Figure 4:
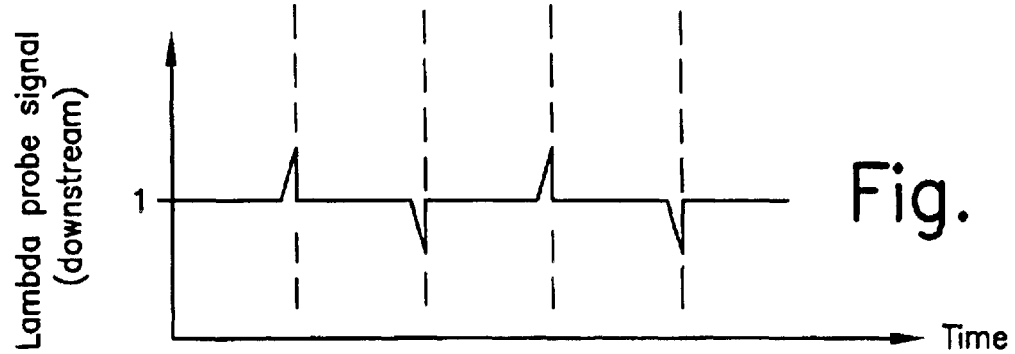

FIGS. 2 through 4 illustrate, in a schematic and idealized diagrammatic depiction, a portion of a desulfating operation of this kind. The diagram in FIG. 2 shows, with reference to a depiction of the change over time in the exhaust gas air ratio upstream from adsorber catalyst 4, the manner in which that ratio oscillates during a desulfating operation between a lean value $\lambda_m$ which is greater than one and a rich value $\lambda_f$ which is less than one, so that there is an alternation between rich operating phases F, in which effective sulfur desorption occurs in adsorber catalyst 4 and oxygen accumulated in three-way catalytic converter 5 is released, and lean operating phases M in which oxygen is introduced into three-way catalytic converter 5. FIG. 3 illustrates the process of storing oxygen in three-way catalytic converter 5, using the simplifying and idealized assumption of a linear change over time in the accumulated oxygen quantity. In lean mode, the accumulated oxygen quantity rises to the maximum storage capacity K of three-way catalytic converter 5, while in the rich operating phases F it then decreases again by the fact that oxygen is released and is used to oxidize sulfur compounds.

The oscillating exhaust gas composition during the desulfating operation may be established in accordance with a control strategy in which the rich operating phases F are maintained for as long as oxygen is still being stored in three-way catalytic converter 5, and the lean operating phases are maintained only for as long as unoccupied oxygen storage space is present in three-way catalytic converter 5. Depending on the application, this can result in different time proportions for the lean operating phases M on the one hand and rich operating phases F on the other hand.

Control of the oscillating exhaust gas composition using this strategy is made easier by the use of lambda probe 6 downstream from three-way catalytic converter 5; the probe's typical signal behavior during desulfating is reproduced in FIG. 4. In the rich operating phases F, the release of oxygen in three-way catalytic converter 5 causes lambda probe 6 initially to measure approximately the stoichiometric value of one for the exhaust gas air ratio at the outlet side of three-way catalytic converter 5. Only when no further oxygen is present in three-way catalytic converter 5 does the lambda probe signal fall. This indicates to combustion control unit 2, to which the lambda probe signal is conveyed, that a changeover to a lean operating phase is necessary, since there is no longer sufficient oxygen present to oxidize the sulfur compounds that have been released from adsorber catalyst 4 as a result of the desulfating conditions and are present in the exhaust gas.

Combustion control unit 2 accordingly switches the system over to lean operation, for example by changing from a rich to a lean air-fuel mixture for combustion source 1, optionally combined with further suitable combustion-controlling measures familiar to those skilled in the art. As the lean operating phase begins, the lambda value measured by lambda probe 6 then therefore rapidly rises again to the stoichiometric value of one, since excess oxygen is being accumulated in the upstream three-way catalytic converter 5. Only when the latter has been filled to its maximum extent with oxygen, and thus when no further oxygen can be introduced into it, does excess oxygen remain in the exhaust gas flow, causing the lambda probe signal to rise above the stoichiometric value of one.

This indicates to combustion control unit 2 that three-way catalytic converter 5 is once again filled with oxygen, and therefore that the lean operating phase M can be terminated. It consequently switches over, by way of suitable combustion-controlling measures familiar to those skilled in the art, to the next rich operating phase F, with which effective desulfating of nitrogen oxide adsorber 4 can be continued. As a result of the switchover to rich mode F, in which oxygen is once again liberated from three-way catalytic converter 5, the lambda probe signal rapidly falls again to the stoichiometric value of one. The above-described behavior of the lambda value downstream from three-way catalytic converter 5, i.e. of the probe signal of lambda probe 6, is illustrated in FIG. 4 synchronously with the diagrams of FIGS. 2 and 3.

It is clear from the above description of an advantageous embodiment that by way of the exhaust emission control system according to the present invention, it is possible to bring about effective purification of a combustion exhaust gas, in particular the removal of nitrogen oxides using a nitrogen oxide adsorber; in addition, the nitrogen oxide adsorber can be effectively desulfated, when its nitrogen oxide adsorption capability has declined due to the deposition of sulfur, by way of desulfating operations with an exhaust gas composition oscillating between lean and rich. As a result of the interposition of phases with a lean exhaust gas composition during a desulfating operation, oxygen can be accumulated in a catalytic element with oxygen storage capability that is placed downstream from the nitrogen oxide adsorber, and can be used in the rich operating phases to oxidize sulfur compounds, in particular hydrogen sulfide, thus preventing the emission of such sulfur compounds. Instead of the three-way catalytic converter indicated, it is also possible to use, for example, a purely oxidizing catalytic converter.

What is claimed is:

1. A method for desulfating a nitrogen oxide adsorber of an exhaust emission control system for a combustion device emitting an exhaust gas, the method comprising:

operating the combustion device so as to vary a composition of the exhaust gas oscillatingly between a lean composition and a rich composition;

accumulating oxygen in an oxygen accumulator downstream from the nitrogen oxide adsorber during a period when the exhaust gas has the lean composition;

releasing at least a portion of the oxygen from the oxygen accumulator during a period when the exhaust gas has the rich composition so as to oxidize sulfur components of the nitrogen oxide adsorber; and sensing an exhaust gas air-fuel ratio of the exhaust gas composition downstream from the oxygen accumulator using a lambda probe, wherein the step of operating the combustion device so as to vary a composition of the exhaust gas is performed according to whether the sensed exhaust gas composition begins to fall or to rise from a stoichiometric value.

2. The method as recited in claim 1 wherein the oxygen accumulator includes at least one of a three-way catalytic converter and an oxidation catalyst with oxygen storage capacity.

3. The method as recited in claim 1, wherein the operating the combustion device so as to vary the composition of the exhaust gas includes switching from a rich to a lean exhaust gas composition when the sensed exhaust gas air-fuel ratio begins to fall from the stoichiometric value, and switching from a lean to a rich exhaust gas composition when the sensed exhaust gas air-fuel ratio begins to rise from the stoichiometric value.

4. An exhaust emission control system for a combustion device emitting exhaust gas, the system comprising:

a nitrogen oxide adsorber; and a desulfating device for varying a composition of the exhaust gas oscillatingly between a rich composition and a lean composition so as to at least partially desulfate the nitrogen oxygen adsorber, the desulfating device including an oxygen accumulator disposed downstream from the nitrogen oxide adsorber, a lambda probe disposed downstream from the oxygen accumulator and an exhaust gas air-fuel ratio controller, the exhaust gas air-fuel ratio controller for varying the composition of the exhaust gas oscillatingly between the rich composition and the lean composition in response to a measurement signal of the lambda probe to provide sufficient oxygen downstream of the nitrogen oxide adsorber to oxidize released sulfur compounds.

5. The exhaust emission control system as recited in claim 4 wherein the oxygen accumulator includes at least one of a three-way catalytic converter and an oxidation catalyst with oxygen storage capability.

6. The exhaust emission control system as recited in claim 4, wherein the exhaust gas air-fuel ratio controller is configured to switch the composition between lean and rich in accordance with the measurement signal of the lambda probe.

* * * * *